(12) United States Patent
He

(10) Patent No.: US 6,905,068 B2
(45) Date of Patent: Jun. 14, 2005

(54) FOCUSING ARRANGEMENT AND METHOD IN ELECTRO-OPTICAL READERS

(75) Inventor: Duanfeng He, South Setauket, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/611,829

(22) Filed: Jul. 1, 2003

(65) Prior Publication Data

US 2005/0001034 A1 Jan. 6, 2005

(51) Int. Cl.⁷ .................................................. G06K 7/10
(52) U.S. Cl. ............. 235/454; 235/462.32; 235/462.35
(58) Field of Search ........................... 235/454, 462.32, 235/462.35; 359/196, 209, 211

(56) References Cited

U.S. PATENT DOCUMENTS

| | | | | |
|---|---|---|---|---|
| 3,720,454 A | * | 3/1973 | Inderhees | 359/201 |
| 4,855,761 A | * | 8/1989 | Hiiro | 347/259 |
| 5,002,365 A | * | 3/1991 | DeJager et al. | 359/618 |
| 5,227,910 A | * | 7/1993 | Khattak | 359/211 |
| 5,526,167 A | * | 6/1996 | Peng | 359/209 |
| 5,696,610 A | * | 12/1997 | Imoto | 358/509 |

\* cited by examiner

*Primary Examiner*—Thien M. Le
*Assistant Examiner*—April Taylor
(74) *Attorney, Agent, or Firm*—Kirschstein, et al.

(57) ABSTRACT

Focusing in an electro-optical reader for reading indicia is obtained by moving one prism relative to another prism. An outgoing laser beam directed to indicia for reflection therefrom and/or return light reflected from the indicia is focused by the moving prism.

15 Claims, 2 Drawing Sheets

FOCUSING ARRANGEMENT AND METHOD IN ELECTRO-OPTICAL READERS

BACKGROUND OF THE INVENTION

1. Field of the Invention

The present invention generally relates to electro-optical systems for reading indicia, for example, bar code symbols, having parts with different light reflectivities and, in particular, to an arrangement for, and a method of, focusing a light beam directed to the indicia, or focusing return light reflected from the indicia, by performing relative motion between a pair of prisms through which the light beam or the return light is transmitted.

2. Description of the Related Art

Various electro-optical readers and systems have previously been developed for reading bar code symbols appearing on a label, or on a surface of a target. The bar code symbol itself is a coded pattern of indicia. Generally, the readers electro-optically transform graphic indicia of the symbols into electrical signals which are decoded into alphanumeric characters. The resulting characters describe the target and/or some characteristic of the target with which the symbol is associated. Such characters typically comprise input data to a data processing system for applications in point-of-sale processing, inventory control, article tracking and the like.

The specific arrangement of symbol elements, e.g., bars and spaces, in a symbol defines the characters represented according to a set of rules and definitions specified by a code or symbology. The relative size of the bars and spaces is determined by the type of code used, as is the actual size of the bars and spaces.

To encode a desired sequence of characters, a collection of element arrangements is concatenated to form the complete symbol, with each character being represented by its own corresponding group of elements. In some symbologies, a unique "start" and "stop" character is used to indicate where the symbol begins and ends. A number of different bar code symbologies presently exists. The symbologies include one-dimensional codes such as UPC/EAN, Code 39, Code 128, Codabar, and Interleaved 2 of 5.

In order to increase the amount of data that can be represented or stored on a given amount of symbol surface area, several new symbologies have been developed. One new code standard, Code 49, introduced a two-dimensional concept of stacking rows of elements vertically instead of extending elements horizontally. That is, there are several rows of bar and space patterns, instead of one long row. The structure of Code 49 is described in U.S. Pat. No. 4,794,239. Another two-dimensional code structure known as PDF417 is described in U.S. Pat. No. 5,304,786.

Electro-optical readers have been disclosed, for example, in U.S. Pat. No. 4,251,798; U.S. Pat. No. 4,369,361; U.S. Pat. No. 4,387,297; U.S. Pat. No. 4,409,470, No. 4,760,248 and U.S. Pat. No. 4,896,026, all of which have been assigned to the assignee of the present invention. These readers generally include a light source consisting of a gas laser or semiconductor laser for emitting a light beam. The use of semiconductor devices as the light source in readers is especially desirable because of their small size, low cost and low power requirements. The laser beam is optically modified, typically by a focusing optical assembly, to form a beam spot having a certain size at a focal distance at which a target is located. Preferably, the cross-section of the beam spot at the focal distance approximates the minimum width between symbol regions of different light reflectivity, i.e., the bars and spaces.

In conventional readers, the light beam is directed by a scan component along a light path toward a target symbol. The reader operates by repetitively scanning the light beam in a scan pattern, for example, a line or a series of lines across the target symbol by movement of the scan component such as a mirror disposed in the path of the light beam. The scan component may sweep the beam spot across the symbol, trace a scan line across and beyond the boundaries of the symbol, and/or scan a predetermined field of view.

Readers also include a sensor or photodetector which functions to detect light reflected or scattered from the symbol. The photodetector or sensor is positioned in the reader in an optical path so that it has a field of view which extends at least across and slightly beyond the boundaries of the symbol. A portion of the light beam reflected from the symbol is detected as return light and converted into an analog electrical signal. A digitizer digitizes the analog signal. The digitized signal from the digitizer is then decoded, based upon the specific symbology used for the symbol, into a binary data representation of the data encoded in the symbol. The binary data may then be subsequently decoded into the alphanumeric characters represented by the symbol.

It is known to change the focal distance to increase the depth of focus of the reader and the range of locations at which the target may be located. As described in U.S. Pat. No. 4,808,804, the laser or the focusing lens may be shifted. A plane parallel plate having sections of different thicknesses may be moved into and out of the path of the light beam to change the focal distance.

It is also known to image a symbol using a two-dimensional array such as a charge coupled device (CCD) sensor. Collection optics including a focusing lens is used to focus the return light onto the CCD sensor. As described in U.S. Pat. No. 6,336,587, a bifocal system changes the focal distance between two values by inserting and removing a plane parallel plate radially into and out of the optical path.

Many applications call for a hand-held reader whose arrangement of electro-optical components must be compact, lightweight, structurally robust to withstand rough handling, and energy efficient to increase the working life of an onboard battery. The smaller is the CCD sensor, the shorter is the focal distance. For such miniature optical systems, the thickness of the plane parallel plate becomes necessarily thinner if the range of focal distances is to remain the same. A very thin plate, however, whether made of glass or plastic, on the order of 0.5 mm in some applications, is difficult to manufacture while still maintaining acceptable optical quality. When mounted with either an adhesive or mechanical fasteners, the thin plate sometimes deforms. The strength or rigidity of the plate is insufficient for applications requiring a high resistance to shock forces during expected rough handling.

In addition, the amount of lateral space necessary to radially move the plate into and out of the optical path is relatively large. For example, if the optical aperture at the plate is 3 mm in diameter and a 0.5 mm margin is needed for mechanical tolerance and for avoiding optical irregularity, then the lateral area needed must be at least 8 mm, and this dimension poses a limit on how small the optical system can be miniaturized.

SUMMARY OF THE INVENTION

Objects of the Invention

One object of this invention is to provide an improved arrangement for and method of focusing a light beam or return light in a reader for reading a data-encoded symbol.

Another object of this invention is to provide an arrangement which is miniature, compact, lightweight, durable and power efficient in operation, and thus is ideally suited for portable hand-held applications.

FEATURES OF THE INVENTION

In keeping with these objects and others which will become apparent hereinafter, one feature of this invention resides, briefly stated, in an arrangement for, and a method of, focusing a light beam directed along an outgoing path toward indicia to be read for reflection therefrom, or focusing return light reflected along a return path from the indicia in a reader for electro-optically reading indicia, such as one-and/or two-dimensional bar code symbols.

The focusing is achieved by performing relative motion between a pair of optical prisms through which the light beam or the return light passes over optical distances within the prisms. Preferably, the prisms are right triangular prisms, each prism having a cross-section that varies transversely of at least one of the paths. A drive performs the relative motion and changes at least one of the optical distances to focus the light beam or the return light at different focii spaced along said at least one path.

The required movement of one prism relative to the other is very small to achieve a usable wide range of focii. Using the previous example, in which the optical aperture is 3 mm in diameter and the required margin is 0.5 mm, one of the prisms of this invention need only be 4 mm in height, and the other only slightly larger in order to accommodate the required variation in focii. The movement can be in drive directions perpendicular to said at least one path, or along a common plane tilted relative to said at least one path. This minimal movement minimizes power consumption, vibration, noise, and overall size and weight of the arrangement and still achieves a practical range of focal distances.

The thinness of a plane parallel plate is no longer an issue. The prisms are readily manufactured with high optical quality and have sufficient thickness and strength to resist deformation in mounting and shock forces encountered during rough handling. A continuous focal change is achieved since the moving prism can be moved to an infinite number of positions.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
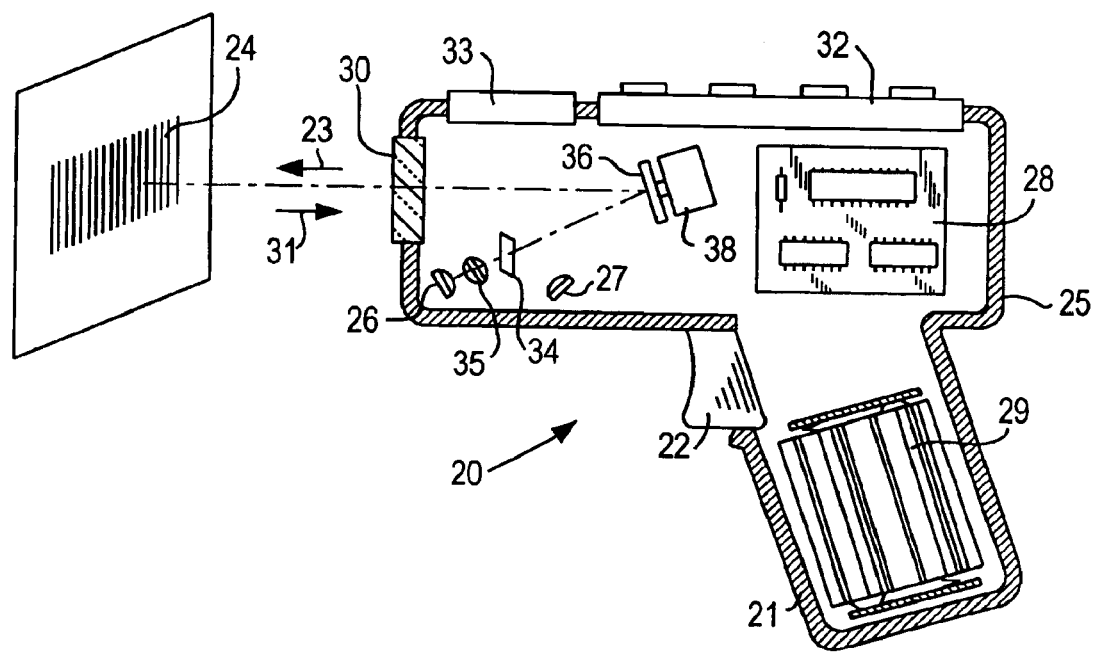
FIG. 1 is a schematic diagram of a hand-held reader for reading a bar code symbol in accordance with the prior art.

Reference numeral 20 in FIG. 1 generally identifies a hand-held reader for electro-optically reading indicia, such as bar code symbol 24, located in a range of working distances therefrom. The reader 20 has a pistol grip handle 21 and a manually actuatable trigger 22 which, when depressed, enables a light beam 23 to be directed at the symbol 24. The reader 20 includes a housing 25 in which a light source 26, a light detector 27, signal processing circuitry 28, and a battery pack 29 are accommodated. A light-transmissive window 30 at a front of the housing enables the light beam 23 to exit the housing, and allows return light 31 scattered off the symbol to enter the housing. A keyboard 32 and a display 33 may advantageously be provided on a top wall of the housing for ready access thereto.

In use, an operator holding the handle 21 aims the housing at the symbol and depresses the trigger. The light source 26 emits a light beam which is optically modified and focused by optics or focusing lens 35 to form a beam spot on the symbol 24. The beam passes through a beam splitter 34 to a scan mirror 36 which is repetitively oscillated at a scan rate of at least 20 scans a second by a motor drive 38. The scan mirror 36 reflects the beam incident thereon to the symbol 24 and sweeps the beam spot across the symbol in a scan pattern. The scan pattern can be a line extending lengthwise along the symbol along a scan direction, or a series of lines arranged along mutually orthogonal directions, or an omnidirectional pattern, just to name a few possibilities.

The reflected return light 31 has a variable intensity over the scan pattern and passes through the window 30 onto the scan mirror 36 where it is reflected onto the splitter 34 and, in turn, reflected to the photodetector 27 for conversion to an analog electrical signal. As known in the art, the signal processing circuitry 28 digitizes and decodes the signal to extract the data encoded in the symbol.

In accordance with one embodiment of this invention, a pair of prisms 40, 42 (see FIG. 2) is positioned in an outgoing path 44 between the light source 26 and the focusing optics or lens 35 depicted in FIG. 1. Each prism is made of glass or plastic and has an index of refraction that is significantly different from that of air.

Prism 40 has a first planar face 46 perpendicular to the path 44, a second planar face 48 parallel to the path 44, and a tilted planar face 50 extending at an angle of inclination A relative to the face 46 across the path 44. Prism 40 is a right triangular prism and, as shown, faces 46, 48 are the legs of the triangle, whereas face 50 is the hypotenuse.

Analogously, prism 42 has a first planar face 52 perpendicular to the path 44, a second planar face 54 parallel to the path 44, and a tilted planar face 56 extending at an angle of inclination B relative to the face 52 across the path 44. Prism 42 is also a right triangular prism and, as shown, faces 52, 54 are the legs of the triangle, whereas face 56 represents the hypotenuse.

Figure 2:
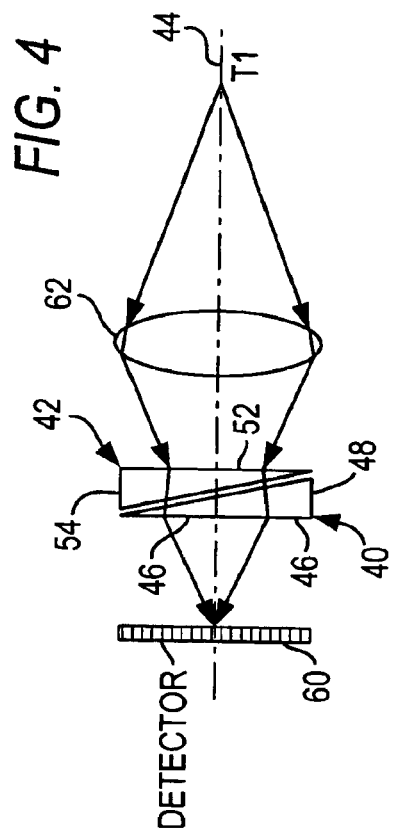
FIGS. 2 and 3 are diagrammatic views of a focusing arrangement in accordance with one embodiment of this invention prior to, and after, movement of a prism.

In FIG. 2, the prisms 40, 42 are positioned such that faces 46, 52 are parallel to each other, faces 48, 54 are parallel to each other, and faces 50, 56 are either in surface area sliding contact with each other along a common tilted plane, or are spaced slightly apart with a minimal air gap therebetween. The prisms together resemble a plane parallel plate in FIG. 2.

A light beam emitted by the source 26 passes through a first optical distance within prism 40 and thereupon through a second optical distance within prism 42 before being focused by lens 35 to a first focus F1 on the optical path 44. The symbol 24 is preferably located at or adjacent the focus F1 so that the symbol can be read.

Figure 3:
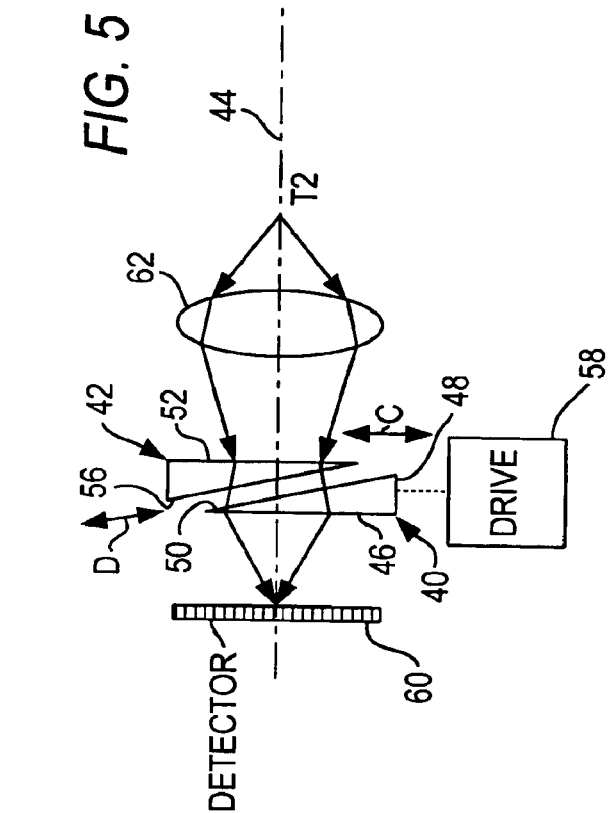

If the symbol 24 is located at a different location, for example, at or adjacent the focus F2 in FIG. 3, where F2 is smaller than F1, then a drive 58 operatively connected to at least one of the prisms, for example, prism 40, is operative to move the prism 40 relative to the other prism 42 along a drive direction. The drive 58 could be operatively connected to both prisms 40, 42 to simultaneously move both prisms toward or away from the path 44. Each prism has a variable cross-section that preferably increases in opposite directions perpendicularly of the path 44. The movement of the prism is preferably performed in an analog, continuous manner.

Due to the wedge shape of each prism, the movement of one or both prisms causes the pair of prisms to emulate a plane parallel plate of variable thickness since a different equivalent thickness is presented to the light beam. The equivalent thickness is the sum of the thicknesses of the prisms in the path of the light beam.

The drive direction of the drive 58 could be perpendicular to the optical axis as represented by the double-headed arrow C, or could be along the common plane as represented by the double-headed arrow D.

Figure 4:
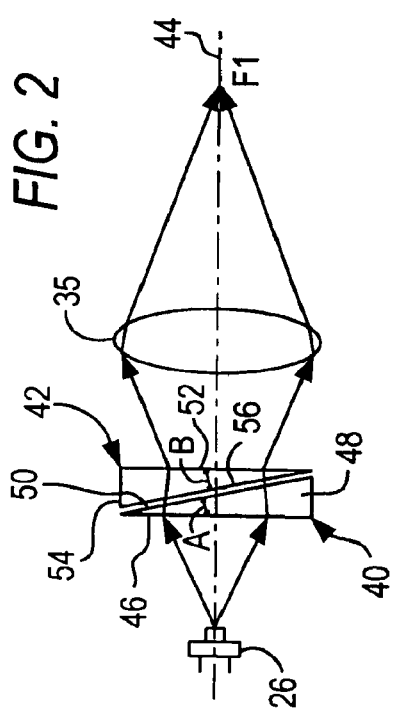
FIGS. 4 and 5 are analogous to FIGS. 2 and 3, but of another embodiment of this invention.
Figure 5:
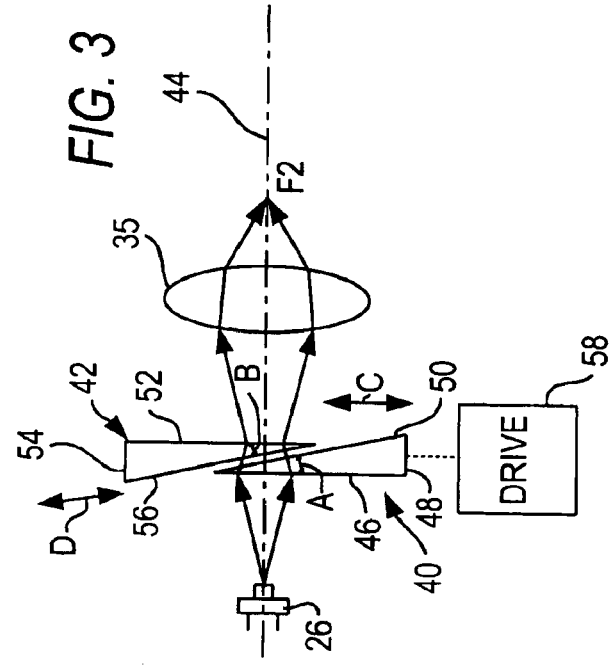

As depicted in FIGS. 4–5, the pair of prisms 40, 42 could also be used between a CCD sensor array 60 and a focusing lens 62 to image return light coming from a target, such as symbol 24, located at variable distances T1 or T2 from the reader 20 onto the individual detectors or cells of the CCD array 60. The movement of the prisms is as described above which again emulates a variable thickness plane parallel plate whose equivalent thickness is the sum of the thicknesses of the prisms in the path of the return light.

The use of a pair of prisms reduces the total space required in the reader. It is no longer necessary for a plate to be entirely removed from or entirely replaced in the optical path 44. If the total equivalent thickness variation is 0.3 mm, and if the tangent of the inclination angle A or B equals ⅓, then the difference in sizes between the prisms is about 0.9 mm, which makes for a very compact, focus-changing arrangement.

Drive sensitivity is determined by the inclination angle. If the sensitivity is too small, then extra space is required for the arrangement.

Unlike the bifocal focusing arrangements of the known art, this invention provides continuous focal change, because one or both prisms can be moved to an infinite number of relative positions. The range of focal change is determined by the equivalent minimum and maximum prism cross-sections.

The movement along the slanted common plane in the directions of arrow D insures that any air gap between the faces 50, 56 is constant. If the air gap were to change, as is the case when there is movement in the directions of arrow C, the optical center of the light beam or the return light will shift, which either must be used to advantage, or compensated for, or be designed so as to not adversely impact performance.

One way to use a shifting optical center is in the case of an imaging reader or camera which uses an aiming laser beam. The aiming beam is used to visually indicate to an operator where the reader is aimed. However, the aiming beam is usually not coaxial with the imaging system and, hence, the location where the aiming beam is incident on the target changes as a function of target distance. If the air gap changes as a result of prism movement in the directions of arrow C, then the center of the image shifts, as does the focus. If the shifts are coordinated, the aiming beam can be arranged to always fall on the center of the image wherever the imaging system is focused.

The drive itself can be any electromechanical, electromagnetic or electro-static drive. A stepper motor could also be used for step-wise control over the prism movement.

It will be understood that each of the elements described above, or two or more together, also may find a useful application in other types of constructions differing from the types described above.

While the invention has been illustrated and described as embodied in a focusing arrangement in electro-optical readers operative by movement of one prism relative to another, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims:

I claim:

1. In a reader for electro-optically reading indicia, an arrangement for focusing at least one of a light beam directed along an outgoing path toward the indicia for reflection therefrom, and return light reflected along a return path from the indicia over a field of view, the arrangement comprising:

a) a first prism through which said at least one of the light beam and the return light is transmitted and optically modified over a first optical distance, the first prism having a first cross-section that varies transversely of at least one of the paths;

b) a second prism through which said at least one of the light beam and the return light is transmitted and optically modified over a second optical distance, the second prism having a second cross-section that varies transversely of said at least one path; and c) a drive for moving at least one of the prisms relative to the other of the prisms in drive directions transversely of said at least one path, and changing at least one of the optical distances to focus said at least one of the light beam and the return light at focii spaced apart at different locations lengthwise along said at least one path.

2. The arrangement of claim 1, wherein each cross-section of the prisms increases in opposite directions as considered perpendicularly to said at least one path.

3. The arrangement of claim 1, wherein each prism is a right triangular prism.

4. The arrangement of claim 1, wherein the first prism has a first planar face extending perpendicularly to said at least one path, and wherein the second prism has a second planar face extending perpendicularly to said at least one path, and wherein the first and second faces are parallel to each other throughout movement of said at least one prism.

5. The arrangement of claim 1, wherein the prisms have planar contact faces in surface area engagement with each other throughout movement of said at least one prism.

6. The arrangement of claim 1, wherein the drive moves said at least one prism in drive directions perpendicular to said at least one path.

7. The arrangement of claim 1, wherein the prisms are right triangular prisms having planar contact faces at each hypotenuse, and wherein the contact faces engage each other in a common plane, and wherein the drive moves said at least one prism in drive directions along said common plane.

8. The arrangement of claim 1, wherein the drive is operative for moving said at least one prism in a continuous manner to form a multitude of focii in a range between a first sum of the first and second optical distances and a second sum of the first and second optical distances.

9. In a method of electro-optically reading indicia, a method of focusing at least one of a light beam directed along an outgoing path toward the indicia for reflection therefrom, and return light reflected along a return path from the indicia over a field of view, the method comprising the steps of:

a) transmitting and optically modifying said at least one of the light beam and the return light over a first optical distance through a first prism having a first cross-section that varies transversely of at least one of the paths;

b) transmitting and optically modifying said at least one of the light beam and the return light over a second optical distance through a second prism having a second cross-section that varies transversely of said at least one path; and c) moving at least one of the prisms relative to the other of the prisms in drive directions transversely of said at least one path, and changing at least one of the optical distances to focus said at least one of the light beam and the return light at focii spaced apart at different locations lengthwise along said at least one path.

10. The method of claim 9, and the step of configuring each cross-section of the prisms to increase in opposite directions as considered perpendicularly to said at least one path.

11. The method of claim 9, and the step of configuring each prism to be a right triangular prism.

12. The method of claim 9, and the step of maintaining planar faces on the prisms in mutual parallelism throughout movement of said at least one prism.

13. The method of claim 9, wherein the moving step is performed by moving said at least one prism in drive directions perpendicular to said at least one path.

14. The method of claim 9, and the step of maintaining planar faces on the prisms in surface area engagement throughout movement of said at least one prism.

15. The method of claim 9, and wherein the moving step is performed by continuously moving said at least one prism to form a multitude of focii in a range between a first sum of the first and second optical distances and a second sum of the first and second optical distances.

* * * * *